Dec. 28, 1965    U. DOMM ET AL    3,226,026
THERMOSTATICALLY CONTROLLED VALVE FOR A STEAM TRAP
Filed April 27, 1964    5 Sheets-Sheet 2

INVENTORS
Ulrich Domm
Werner Fotter
Rudolf Egelhofer
BY Michael J. Striker

INVENTORS
Ulrich Domm
Werner Föller
Rudolf Egelhofer
BY Michael J. Striker

Dec. 28, 1965   U. DOMM ETAL   3,226,026
THERMOSTATICALLY CONTROLLED VALVE FOR A STEAM TRAP
Filed April 27, 1964   5 Sheets-Sheet 4

INVENTORS
Ulrich Domm
Werner Föller
Rudolf Egelhofer
BY Michael J. Striker

INVENTORS
Ulrich Domm
Werner Föller
Rudolf Egelhofer
BY
Michael J. Striker

United States Patent Office 3,226,026
Patented Dec. 28, 1965

3,226,026
THERMOSTATICALLY CONTROLLED VALVE
FOR A STEAM TRAP
Ulrich Domm and Werner Föller, Frankenthal, and
Rudolf Egelhofer, Münchweiler, Pfalz, Germany, assignors to Klein, Schanzlin & Becker Aktiengesellschaft,
Frankenthal, Pfalz, Germany
Filed Apr. 27, 1964, Ser. No. 362,748
Claims priority, application Germany, Apr. 27, 1963,
K 49,597
17 Claims. (Cl. 236—59)

The present invention relates to a thermostatically controlled valve for a steam trap in which a valve body is moved against the pressure of the fluid into the sealing engagement with a valve seat.

The control of the movement of the valve body in sealing engagement with the valve seat is obtained by the action of a column of superposed elements located in the path of fluid flowing to the valve seat and connected to the valve body, which superposed elements include a plurality of pairs of bimetal members or bimetal plates which curve during increase of their temperature in opposite directions so that the column will expand as the temperature of the fluid flowing to the valve seat increases to thus move the valve body in sealing engagement with the valve seat. The column of superposed elements may also include one or more spring elements or spring plates cooperating with the bimetal members to change, when stressed by the expanding bimetal members the pressure at which the valve body is pressed against the valve seat.

Such thermostatically controlled valves for steam traps are known in the art and such an arrangement is for instance described in the copending application Serial No. 180,571, now Patent No. 3,169,704.

In one modification of the aforementioned application, the column of superposed elements is composed of bimetal plates of different strength so that when the valve is closed the weaker bimetal plates will be compressed by the stronger bimetal plates during rise of the temperature of the fluid flowing to the valve seat.

In another embodiment disclosed in the aforementioned application, the column includes also a plurality of spring plates cooperating with the bimetal plates in such a manner that during rise of the temperature the spring plates are compressed by the curving and expanding bimetal plates.

By appropriately dimensioning the bimetal plates and/or spring plates it is possible to arrive at a valve closing force varying in dependence of the temperature of the fluid flowing toward the valve seat along a curve which closely approximates the pressure curve of saturated steam.

These known arrangements have however the disadvantage that they react relatively slow to changes in temperature and/or of the amount of fluid flowing to the valve seat, especially if a plurality of bimetal plates are completely compressed by the stronger bimetal plates after closing in the valve, whereby the heat transfer between the fluid and the compressed bimetal plates will necessarily be very slow.

It is an object of the present invention to provide for a thermostatically controlled valve for a steam trap of the type mentioned above, which avoids the disadvantages of such thermostatically controlled valves known in the prior art.

It is a further object of the present invention to provide for a thermostatically controlled valve which reacts very fast to changes of temperature and/or changes of the amount of fluid flowing to the valve seat of the valve.

It is an additional object of the present invention to provide for such a thermostatically controlled valve which is composed of relatively few and simple parts so that the valve arrangement can be constructed at relatively small cost and so that the valve arrangement will operate trouble-free during extended use.

With these objects in view the thermostatically controlled valve for a steam trap according to the present invention includes a valve seat, a valve body to be moved against the pressure of the fluid flowing to the valve seat in sealing engagement with the latter, a stationary abutment member upstream of the valve seat, a movable abutment member also upstream of the valve seat and spaced from the stationary member and connected to the valve body, and a column of superposed elements located in the path of fluid flowing to the valve seat between the abutment members and engaging with the opposite ends thereof said abutment members, respectively. These superposed elements include a plurality of pairs of bimetal members curving in opposite directions during increase of the temperature of the fluid flowing to the valve seat, and at least one spring member constructed to engage one of the other members at least at two spaced contact points. The column will expand during rise of the temperature of the fluid flowing to the valve seat to move at a predetermined temperature the valve body in engagement with the valve seat and the spring member is flexed thereby to an increasing extent so as to change the spacing between the contact points in response to changes of the temperature, whereby the active portion and the stiffness of the spring member and thereby the pressure at which the valve body is pressed against the valve seat is changed in response to temperature changes of the fluid.

The spring member may be precurved, for instance the spring member may be in the form of a substantially conically-shaped spring plate, arranged to engage with the inner concave surface thereof the convexly curving surface of a bimetal plate adjacent thereto so that the common contact line between the two plates moves continuously during rise of the temperature from the outer edge of the spring plate toward the center thereof when the spring plate is flexed to an increasing extent by the expanding bimetal plates.

The shape of the control curve of the valve, that is the variation of the closing force in response to changes of the temperature of the fluid flowing to the valve seat of the valve arrangement, may be further varied by forming in the spring plate and/or bimetal plate in engagement therewith a plurality of cutouts extending from the periphery of the respective plate toward the center thereof so that the spring plate and/or bimetal plate engages only with part of its edge portion the corresponding other plate, or the closing force curve may also be varied by arranging a plurality of spring plates having respectively different sizes or forms in series with the bimetal plates.

According to the present invention the spring member may be constructed and arranged to engage a member adjacent thereto in many different ways which are described in detail later on and common to all modifications according to the present invention is the arrangement of the spring member or spring members and one member adjacent thereto in such a manner that during heat expansion of the column the spring member or members are flexed to an increasing extent in such a manner that the spacing between opposite points of contact of the spring member and the member contacted thereby changes and preferably in such a manner that during rise of the temperature and expansion of the column opposite contact points of the spring member move toward each other so that the stiffness of the spring member increases during rise of the temperature of the fluid flowing to the valve seat.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 10:
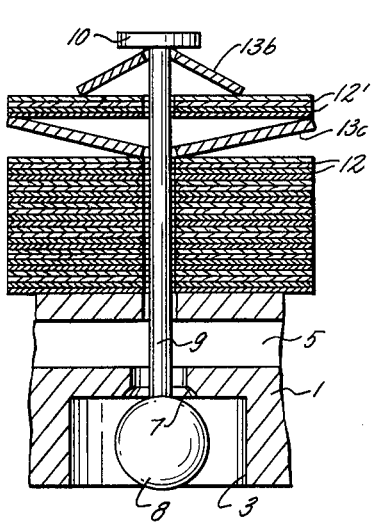

FIG. 10 is a further modification according to the present invention and showing in a partial cross section an arrangement in which spring members of different dimensions and configuration cooperate with the bimetallic members; and FIGS. 11–22 are partial sectional views of further modifications, in which FIGS. 11, 13, 15, 17, 19 and 21 respectively show the modifications in cold and FIGS. 12, 14, 16, 18, 20 and 22 in hot and expanded positions, respectively.

Figure 1:
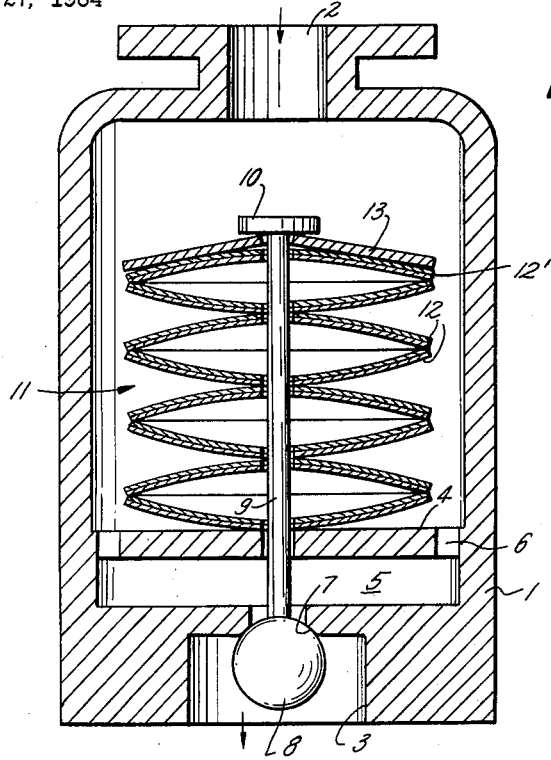
FIG. 1 is a longitudinal cross section through one modification of a thermostatically controlled valve for a steam trap according to the present invention.

Referring now to the drawings, and more specifically to FIGS. 1–5 of the same in which one modification according to the present invention is illustrated, it will be seen that this modification comprises, as shown in FIG. 1, a housing 1 having an inlet passage 2 through which steam and/or condensate may enter into the interior of the housing to pass from there through the channels 6 into the chamber 5 and leave the housing through the outlet passage 3. A valve seat 7 is provided in a transverse wall portion between the chamber 5 and the outlet passage 3 and a valve body 8 is arranged coaxial with the valve seat for movement toward and away from the valve seat for opening and closing the valve. A valve stem 9 connected at its lower end to the valve body 8 extends centrally through an opening in the bottom wall 4 of the housing into the interior of the latter. A transverse member 10 fixed to the upper end of the valve stem 9 forms a movable abutment member, whereas the bottom wall 4 of the housing forms a stationary abutment member. A column 11 of superposed elements is located between the abutment members 4 and 10 in the path of fluid flowing to the valve seat 7. The superposed elements of the column include a plurality of pairs of bimetal members 12, shown in FIG. 1 as circular bimetal plates each provided with a central hole through which the valve stem 9 extends, and the bimetal members in each pair curve during increase of the temperature of the fluid flowing to the valve seat 7 in opposite directions as shown in FIG. 1. The superposed elements of the column 11 further include a spring member 13, shown in FIG. 1 as a precurved substantially conical spring plate or spring washer 13, sandwiched between the uppermost of the bimetal members 12′ and the movable abutment member 10.

Figure 2:
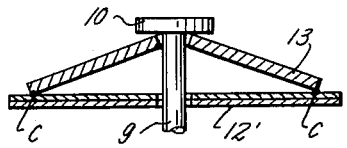
FIGS. 2–5 are partial cross sectional views similar to FIG. 1 and illustrating the cooperation of the spring member with the bimetallic member adjacent thereto at various temperatures and during increasing curving of the bimetallic member.
Figure 3:
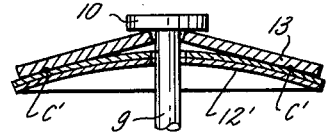

The cooperation of the spring member 13 with the bimetal members 12 is more clearly shown in FIGS. 2–5 in which for simplicity sake only the uppermost of the bimetal members 12, the spring member 13, the movable abutment member 10 and the upper part of the valve stem 9 is shown. FIG. 2 shows the arrangement in substantially cold condition in which the bimetal members 12, only the uppermost 12′ is shown in FIG. 2, are all flat and in which the spring member 13 is in unstressed condition, that is it has the conical shape to which it is originally formed. It is evident that under these conditions the length of the column 11 is shorter than shown in FIG. 1 and therefore the valve body 8 will be spaced downwardly from the valve seat 7 and the valve will be open. In this position the spring member 13 contacts the upper surface of the uppermost bimetal member 12′ along a substantially circular contact line which coincides with the free edge $c$–$c$ at the flared lower end of the spring member 13. Rise of the temperature of the fluid passing through the valve will cause the bimetal members in each pair of bimetal members to curve in opposite directions so that the column 11 will expand to move thereby the valve body 8 against the valve seat 7 and to close the valve. The arrangement is made in such a manner that at the predetermined temperature of the fluid flowing to the valve seat the expanding column 11 will press the valve body 8 against the valve seat 7. The closing force produced by the expanding bimetal members will be transmitted along the contact line $c$–$c$ to the spring member 13 and from this spring member onto the movable abutment member 10 and from the latter through the valve stem 9 onto the valve body 8. During further rise of the temperature, the bimetal members will curve further which will cause, since the valve stem and the upper abutment member 10 cannot move further upwardly, flexing or flattening of the spring 13, as shown in FIG. 3 whereby the contact line between spring member 13 and the uppermost of the bimetal members 12′ will move from the position $c$–$c$ shown in FIG. 2 to the position $c'$–$c'$ as shown in FIG. 3.

Figure 4:
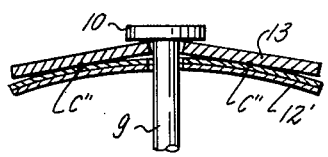
Figure 5:
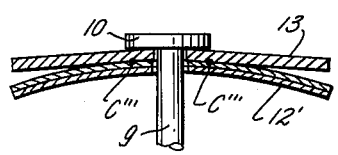

FIG. 4 shows the arrangement approximately in the middle of its working range. The bimetal members are curved to a slightly greater extent than shown in FIG. 3 and the spring member 13 is further flattened so that the line of contact $c''$–$c''$ is approximately in the middle between the outer and inner diameter of the spring member 13. FIG. 5 shows the arrangement near its upper working range in which the contact lines $c'''$–$c'''$ has moved close to the inner diameter of the spring member 13.

The increased curving of the bimetal plate 12′ during temperature rise and the flattening of the spring member 13 to an increasing extent will cause movement of the contact line $c$–$c$ from the outer toward the inner periphery of the spring member 13 and therewith a continuous shortening of the active portion of the spring member or a continuous stiffening of the spring member 13. This stiffening of the spring member 13 will cause a corresponding increase of the pressure at which the valve body 8 is pressed against the valve seat 7 in response to temperature increase so that a curve plotting the closing force in relation to the temperature will closely approximate the pressure curve of saturated steam.

This control curve of the valve according to the present invention may be varied in many different ways and various modifications of the arrangement shown in FIGS. 1–5 will now be described.

Figure 6:
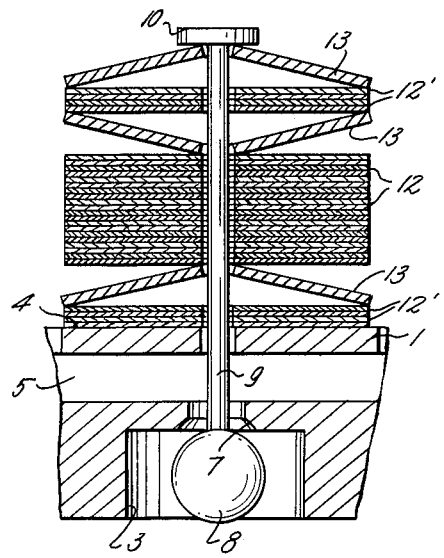
FIG. 6 is a partial cross sectional view similar to FIG. 1 and showing a modification in which a plurality of spring members are arranged in series with the bimetallic members.

FIG. 6 shows a modification in which instead of a single spring member 13 three substantially conically-shaped spring members 13 are used which are arranged with respect to the bimetal member 12 and the other elements of the above described valve arrangement as clearly shown in FIG. 6. FIG. 6 shows the arrangement in cold condition and as will be evident from the above description of the arrangement shown in FIGS. 1–5, the springs 13 of the arrangement shown in FIG. 6 will cooperate with the bimetal members 12' adjacent thereto in the manner as described in connection with FIGS. 1–5.

Figure 7:
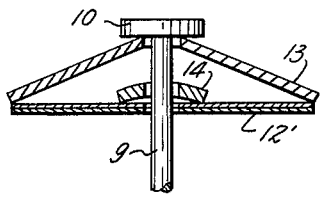
FIG. 7 is a partial cross sectional view similar to FIG. 2 and showing a rigid spacer member between the inner surface of the spring member and the outer surface of the bimetal member adjacent thereto.

FIG. 7 which shows only part of a further modification illustrates a rigid spacer member 14 arranged between the outer surface of the uppermost bimetal member 12' and the spring member 13. In cold condition, the upper surface of the spacer member 14 will be spaced from the inner concave surface of the spring member 13 and during temperature rise and curving of the bimetal member 12', the upper surface of the spacer member 14 will come in contact with the bottom surface of the spring member 13.

Figure 8:
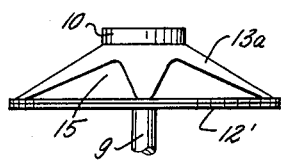
FIG. 8 is a partial side view of a further modification in which the spring member is formed with a plurality of cutouts.
Figure 9:
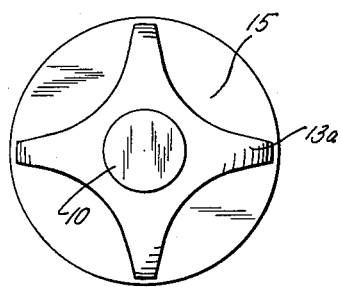
FIG. 9 is a top view of the arrangement shown in FIG. 8.

FIGS. 8 and 9 show a further modification according to the present invention and in this modification the spring member 13a is formed with a plurality of cutouts 15 having their greatest width at the periphery of the spring member and tapering toward the inner periphery of the latter. During curving of the uppermost bimetal member 12' and corresponding flattening of the spring member 13a in the manner as described before, the contact line between bimetal member 12' and spring member 13a will move from the outer toward the inner periphery of the latter and thereby continuously stronger portions of the spring members 13a will come in contact with the bimetal member 12' so that the stiffness of the spring member 13a will increase faster during corresponding curving of the bimetal member 12' than in the arrangement as described in connection with FIGS. 1–5.

The modification shown in FIG. 10 is similar to the modification shown in FIG. 6 in that a plurality of spring members are arranged in series with the bimetal members. However, while the arrangement shown in FIG. 6 identical spring members are used, the arrangement illustrated in FIG. 10 shows spring members 13b and 13c which are of different size and configuration. As shown in FIG. 10 the spring member 13b has a smaller diameter, but a bigger cone angle than the spring member 13c. This arrangement will obviously produce a control curve of different configuration than the other before described arrangements.

The following arrangements show additional modifications according to the present invention which permit to vary the control curve, that is the size of the closing force at which the valve body 8 is pressed against the valve seat may be varied in dependence of the temperature of the fluid passing to the valve seat.

Figure 11:
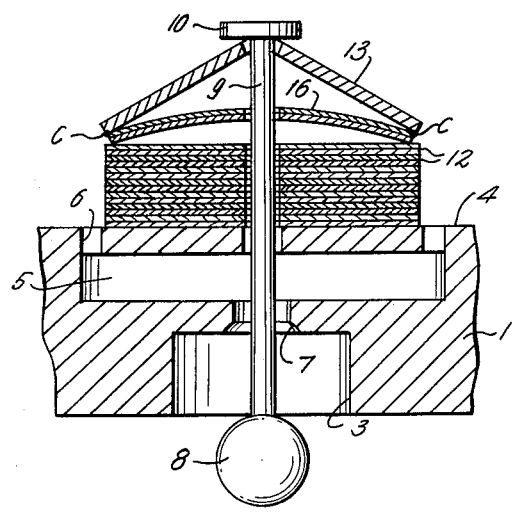
Figure 12:
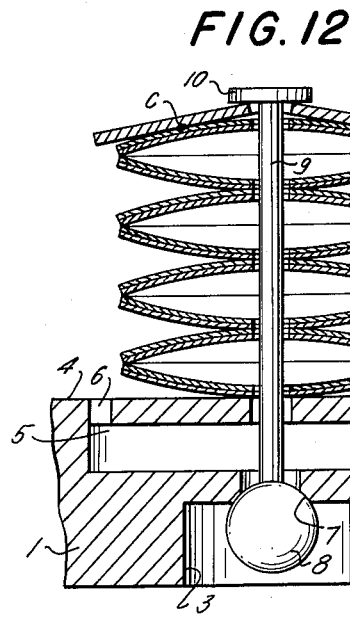

The arrangement shown in FIGS. 11 and 12 includes a plurality of bimetal members 12 which are flat in substantially cold condition as shown in FIG. 11, but the topmost of the bimetal members, that is the member 16 is precurved as shown in FIG. 11 in cold condition and constructed to flatten during rise of temperature. The precurved bimetal member 16 cooperates with a conical spring 13 which abuts with the inner surface thereof against the convexly curved surface of the bimetal members 16 and with its upper end against the movable abutment member 10. It is understood that the remaining part of the arrangement not shown in FIG. 11 is substantially identical to the arrangement shown in FIG. 1. FIG. 12 shows the arrangement of FIG. 11 in hot condition in which the bimetal members 12 are curved, whereas the bimetal member 16 is flatter than in the cold condition. This arrangement will obviously cause a slower inward movement of the contact line c–c during corresponding temperature rise than the arrangement shown in FIGS. 1–5.

Figure 13:
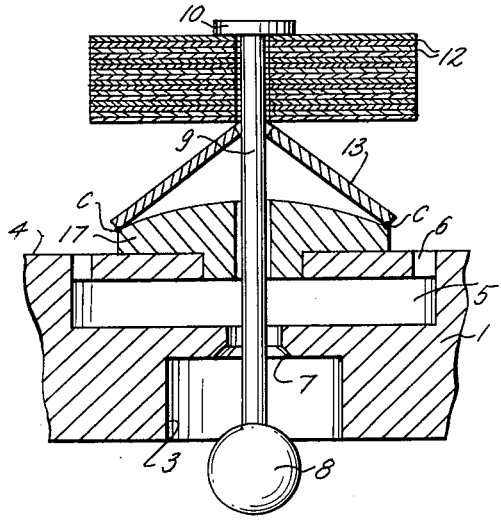
Figure 14:
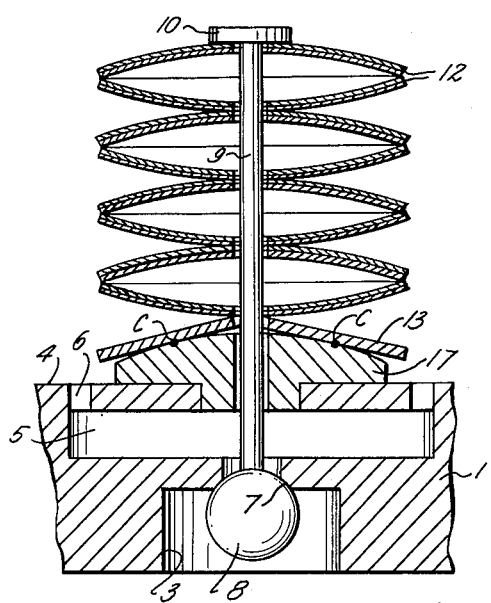

FIGS. 13 and 14 show a further modification according to the present invention. In this arrangement the spring 13 does not cooperate with a curving bimetal member, but the inner surface of the spring member 13 engages the convexly curved top surface of a stationary abutment member 17 formed with a central opening through which the valve stem 9 extends. During rise of the temperature the bimetal members 12 in each pair will curve in opposite directions as shown in FIG. 14 to move the valve body 8 in engagement with the valve seat 7 and to cause during further expansion and curving of the bimetal members 12 increasing flattening of the spring 13 so that the line of contact c–c will move from the position shown in FIG. 13 to the position shown in FIG. 14.

Figure 15:
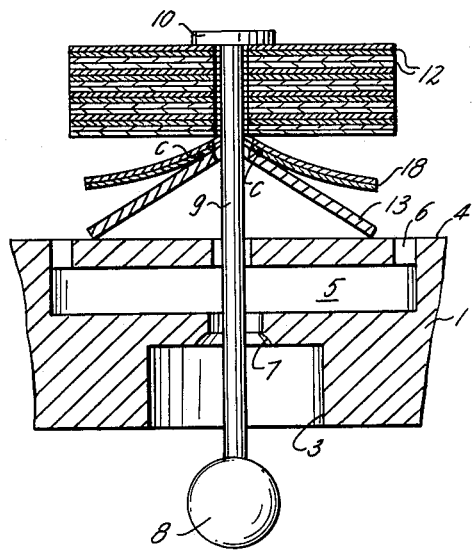
Figure 16:
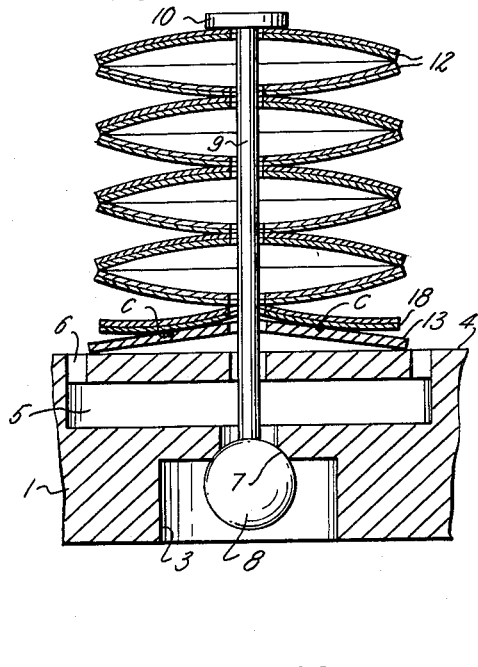

FIGS. 15 and 16 show an additional modification. In this arrangement the column of superposed elements comprises a plurality of pairs of bimetal members 12 which curve during heat expansion in opposite directions, a conical spring member 13 at the bottom of the column, and a precurved bimetal member 18 sandwiched between the upper surface of the spring 13 and the lowermost of the bimetal members 12. In the cold condition of the arrangement as shown in FIG. 15, the spring 13 contacts the precurved bimetal member 18 with which the spring 13 cooperates near the inner periphery of the spring as shown in FIG. 15, while during temperature rise the bimetal member 12 will curve in opposite directions while the precurved bimetal member 18 is constructed to flatten during temperature rise so that the line of contact c—c between members 18 and 13 will move outwardly during rise of the temperature.

Figure 17:
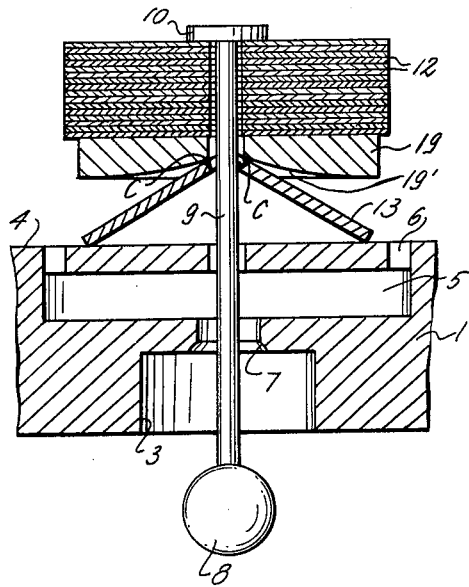
Figure 18:
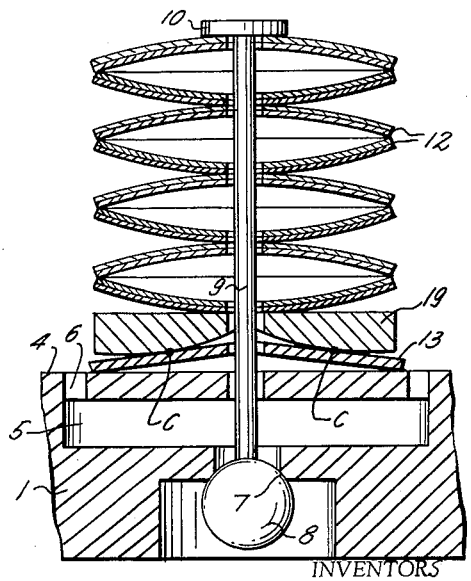

FIGS. 17 and 18 show a further modification according to the present invention. In this arrangement the column of superposed elements comprises a plurality of pairs of bimetal members 12 which curve in opposite direction during rise of temperature, a substantially conically-shaped spring member 13 at the bottom of the column, and a rigid member 19 sandwiched between the upper surface of the spring member 13 and the bottom surface of the lowermost of the bimetal members 12. The member 19 is formed with a central cavity 19' defined by a surface of revolution having a convexly curved generatrix, and the outer surface of the spring member 13 engages the surface of revolution defining the cavity 19'. FIG. 17 shows the arrangement in cold condition and FIG. 18 during rise of the temperature and as can be seen from the comparison of the two figures, the line of contacts c—c between the outer surface of the spring member 13 and the surface of the cavity 19' will move during rise of the temperature from the inner periphery of the spring member 13 toward the outer periphery thereof.

Figure 19:
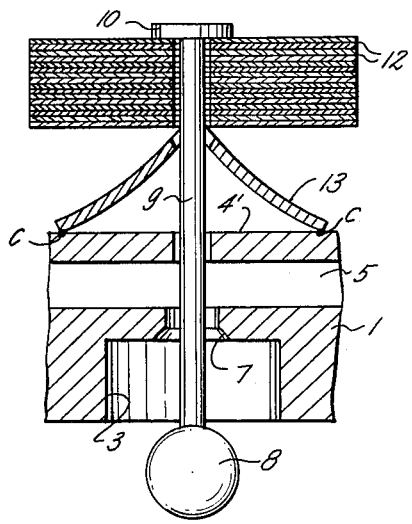
Figure 20:
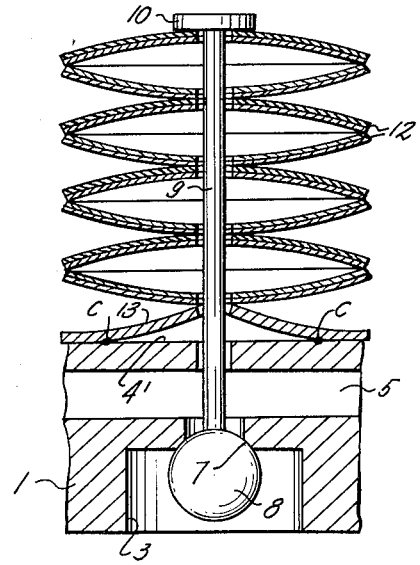

An additional modification is shown in FIGS. 19 and 20. In this modification the column of superposed elements includes a plurality of pairs of bimetal members 12 and a substantially conically-shaped spring member 13 at the bottom of the column, and engaging with its inner surface thereof the plane top surface 4' of the bottom wall of the valve housing. In cold condition of the arrangement, as shown in FIG. 19, the line of contact c—c will substantially coincide with the bottom edge of the spring member 13, while during temperature rise and curving of the bimetal members 12, the spring member 13 will be flattened to an increasing extent so that the line of contact c—c will move inwardly as shown in FIG. 20 in which the arrangement is shown in hot condition.

Figure 21:
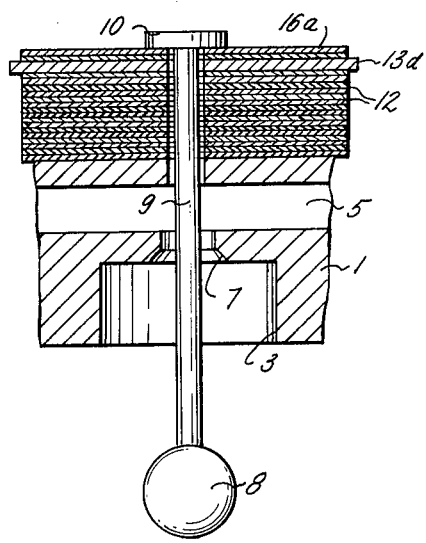
Figure 22:
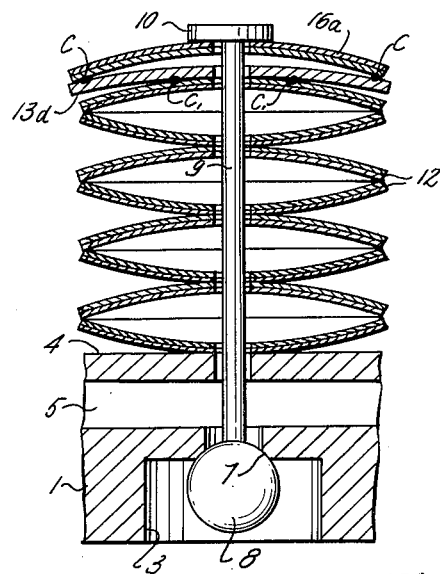

Finally, FIGS. 21 and 22 show an adidtional modification according to the present invention. The column of superposed elements in the modification shown in these two figures comprises an uppermost bimetal member 16a abutting with the upper surface thereof against the movable abutment member 10, a flat spring member 13d abutting against the bottom surface of the bimetal member 16a and a plurality of pairs of bimetal members 12 between the spring member 13d and the stationary abutment member 4 of the housing 1. As can be seen from a comparison of FIGS. 21 and 22, during rise of the temperature and corresponding curving of the bimetal members 16a and 12 as shown in FIG. 22, the original flat spring member 13b will be curved to an increasing extent and the upper convexly curved surface of the spring member 13d will contact the concavely curved inner surface of the bimetal member 16a along the contact line c—c, whereas the concavely curved bottom surface of the spring member 13d will contact the convexly curved upper surface of the bimetal member 12 adjacent thereto along the contact line $c_1$—$c_1$ as shown in FIG. 22.

While the spring members have been described as spring plates, it is obvious that strip-shaped spring members can also be used according to the present invention.

Common to all arrangements is that, during rise of the temperature of the fluid, the spring member is flexed to an increasing extent by the expanding column so that the spacing between opposite contact points between the spring member and the member cooperating therewith is changed in response to changes of the temperature, whereby the stiffness of the spring member and the pressure at which the valve body 8 is pressed against the valve seat 7 is changed in response to temperature changes of the fluid flowing to the valve seat. In the embodiments in which the spring member cooperates directly with a bimetal member adjacent thereto, the change of the distance between opposite contact points of spring and bimetal member during changes of the temperature of the column is produced by the changes of the curvature of the spring member and that of the bimetal member contacted by the spring member.

It will be understood that each of the elements described above, or two or more together, may also find a useful application in other types of thermostatically controlled valves differing from the types described above.

While the invention has been illustrated and described as embodied in a thermostatically controlled valve for a steam trap, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a thermostatically controlled valve for a steam trap having a valve seat and a valve body to be moved against the pressure of the fluid flowing to the valve seat in sealing engagement with the latter, in combination, a stationary abutment member upstream of said valve seat; a movable abutment member upstream of said valve seat, spaced from said stationary abutment member and connected to said valve body; and a column of superposed elements located between said abutment members in the path of fluid flowing to said valve seat and engaging with opposite ends thereof said abutment members, respectively, said superposed elements of said column including a plurality of pairs of bimetal members curving in opposite directions during increase of the temperature of the fluid flowing to said valve seat, and at least one spring member constructed to engage one of the other members at least at two spaced contact points, said column expanding during rise of the temperature of the fluid flowing to said valve seat to move at a predetermined temperature said valve body in engagement with said valve seat and to flex during further rise of the temperature said spring member to an increasing extent so as to change the spacing of said contact points in response to changes of the temperature of the fluid, whereby the stiffness of said spring member and the pressure at which said valve body is pressed against said valve seat is changed in response to temperature changes of the fluid.

2. In a thermostatically controlled valve for a steam trap having a valve seat and a valve body to be moved against the pressure of the fluid flowing to the valve seat in sealing engagement with the latter, in combination, a stationary abutment member upstream of said valve seat; a movable abutment member upstream of said valve seat, spaced from said stationary abutment member and connected to said valve body; and a column of superposed elements located between said abutment members in the path of fluid flowing to said valve seat and engaging with opposite ends thereof said abutment members, respectively, said superposed elements of said column including a plurality of pairs of bimetal members curving in opposite directions during increase of the temperature of the fluid flowing to said valve seat, so that the surfaces of each pair facing away from each other are convexly curved, and a precurved spring member engaging the convexly curving surface of one bimetal member adjacent thereto at least at two spaced contact points, said column expanding during rise of the temperature of the fluid flowing to said valve seat to move at a predetermined temperature said valve body in engagement with said valve seat and to flex during further rise of the temperature said spring member to an increasing extent so as to change the spacing of said contact points in response to changes of the temperature of the fluid, whereby the stiffness of said spring member and the pressure at which said valve body is pressed against said valve seat is changed in response to temperature changes of the fluid.

3. In a thermostatically controlled valve for a steam trap having a valve seat and a valve body to be moved against the pressure of the fluid flowing to the valve seat in sealing engagement with the latter, in combination, a stationary abutment member upstream of said valve seat; a movable abutment member upstream of said valve seat, spaced from said stationary abutment member and connected to said valve body; and a column of superposed elements located between said abutment members in the path of fluid flowing to said valve seat and engaging with opposite ends thereof said abutment members, respectively, said superposed elements of said column including a plurality of pairs of bimetal members curving in opposite directions during increase of the temperature of the fluid flowing to said valve seat, so that surfaces of each pair facing away from each other are convexly curved, and a substantially conically shaped spring member engaging with its concave inner surface the outer convexly curving surface of one bimetal member adjacent thereto along an initial substantially circular contact line having a predetermined radius, said column expanding during rise of the temperature of the fluid flowing to said valve seat to move at a predetermined temperature said valve body in engagement with said valve seat and to flex during further rise of the temperature and further curving of said bimetal members said spring member to an increasing extent so as to change said predetermined radius of said initial contact line in response to changes of the temperature of the fluid, whereby the stiffness of said spring member and the pressure at which said valve body is pressed against said valve seat is changed in response to temperature changes of the fluid.

4. A valve as set forth in claim 3, wherein a plurality of spring members are arranged in series with pairs of said bimetal members.

5. A valve as set forth in claim 3 and including a substantially rigid spacer member arranged between the outer surface of said one bimetal member and the inner surface of said spring member substantially coaxial with said members and spaced, when the temperature of the fluid is below said predetermined temperature from one of said surfaces.

6. A valve as set forth in claim 3, wherein at least said spring member is formed with a plurality of cut-outs extending from the periphery of said spring member into the latter.

7. A valve as set forth in claim 6, wherein said cut-outs have their greatest width at said periphery and narrowing toward the center of said spring member.

8. A valve as set forth in claim 3, wherein at least two substantially conically shaped spring members are arranged in series with said pairs of bimetal members, one of said spring members having a maximum diameter greater than the other spring member.

9. A valve as set forth in claim 3, wherein at least two substantially conically shaped spring members are arranged in series with said pairs of bimetal members, one of said spring members having a cone angle greater than the other spring member.

10. In a thermostatically controlled valve for a steam trap having a valve seat and a valve body to be moved against the pressure of the fluid flowing to the valve seat in sealing engagement with the latter, in combination, a stationary abutment member upstream of said valve seat; a movable abutment member upstream of said valve seat, spaced from said stationary abutment member and connected to said valve body; and a column of superposed elements located between said abutment members in the path of fluid flowing to said valve seat and engaging with opposite ends thereof said abutment members, respectively, said superposed elements of said column including a plurality of pairs of bimetal members curving in opposite directions during increase of the temperature of the fluid flowing to said valve seat, a precurved bimetal member having a convex surface and constructed to flatten during temperature increase, and a substantially conically shaped spring member engaging with its inner concave surface said convex surface of said precurved bimetal member along an initial substantially circular contact line having a predetermined radius, said column expanding during rise of the temperature of the fluid flowing to said valve seat to move at a predetermined temperature said valve body in engagement with said valve seat and to flex during further rise of the temperature said spring member to an increasing extent so as to change said predetermined radius of said initial contact line in response to changes of the temperature of the fluid, whereby the stiffness of said spring member and the pressure at which said valve body is pressed against said valve seat is changed in response to temperature changes of the fluid.

11. In a thermostatically controlled valve for a steam trap having a valve seat and a valve body to be moved against the pressure of the fluid flowing to the valve seat in sealing engagement with the latter, in combination, a stationary abutment member upstream of said valve seat; a movable abutment member upstream of said valve seat, spaced from said stationary abutment member and connected to said valve body; one of said abutment members having a convexly curved abutment surface and a column of superposed elements located between said abutment members in the path of fluid flowing to said valve seat and engaging with one end said convexly curved abutment surface of said one abutment member and with the other end of the other of said abutment members, said superposed elements of said column including a plurality of pairs of bimetal members curving in opposite directions during increase of the temperature of the fluid flowing to said valve seat, and one substantially conically shaped spring member at said one end of said column and engaging with its inner concave surface said convexly curved abutment surface along an initial substantially circular contact line having a predetermined radius, said column expanding during rise of the temperature of the fluid flowing to said valve seat to move at a predetermined temperature said valve body in engagement with said valve seat and to flex during further rise of the temperature said spring member to an increasing extent so as to change said predetermined radius of said initial contact line in response to changes of the temperature of the fluid, whereby the stiffness of said spring member and the pressure at which said valve body is pressed against said valve seat is changed in response to temperature changes of the fluid.

12. In a thermostatically controlled valve for a steam trap having a valve seat and a valve body to be moved against the pressure of the fluid flowing to the valve seat in sealing engagement with the latter, in combination, a stationary abutment member upstream of said valve seat; a movable abutment member upstream of said valve seat, spaced from said stationary abutment member and connected to said valve body; and a column of superposed elements located between said abutment members in the path of fluid flowing to said valve seat and engaging with opposite ends thereof said abutment members, respectively, said superposed elements of said column including a plurality of pairs of bimetal members curving in opposite directions during increase of the temperature of the fluid flowing to said valve seat, a substantially conically shaped spring member at one end of said column and abutting with the flared end thereof against one of said abutment members, and a precurved bimetal member having a concave surface and constructed to flatten during temperature increase sandwiched between said spring member and the pair of bimetal members adjacent said spring member, the convex outer surface of said spring member engaging said concave surface of said precurved bimetal member along an initial substantially circular contact line of a predetermined radius, said column expanding during rise of the temperature of the fluid flowing to said valve seat to move at a predetermined temperature said valve body in engagement with said valve seat and to flex during further rise of the temperature said spring member to an increasing extent so as to change said predetermined radius of said initial contact line in response to changes of the temperature of the fluid, whereby the stiffness of said spring member and the pressure at which said valve body is pressed against said valve seat is changed in response to temperature changes of the fluid.

13. In a thermostatically controlled valve for a steam trap having a valve seat and a valve body to be moved against the pressure of the fluid flowing to the valve seat in sealing engagement with the latter, in combination, a stationary abutment member upstream of said valve seat; a movable abutment member upstream of said valve seat, spaced from said stationary abutment member and connected to said valve body; and a column of superposed elements located between said abutment members in the path of fluid flowing to said valve seat and engaging with opposite ends thereof said abutment members, respectively, said superposed elements of said column including a plurality of pairs of bimetal members curving in opposite directions during increase of the temperature of the fluid flowing to said valve seat, a substantially conically shaped spring member at one end of said column and abutting with the flared end thereof against said stationary abutment member, and a precurved bimetal member having a concave surface and constructed to flatten during temperature increase sandwiched between said spring member and the pair of bimetal members adjacent said spring member, the convex outer surface of said spring member engaging said concave surface of said precurved bimetal member along an initial substantially circular contact line of a predetermined radius, said column expanding during rise of the temperature of the fluid flowing to said valve seat to move at a predetermined temperature said valve body in engagement with said valve seat and to flex during further rise of the temperature said spring member to an increasing extent so as to change said predetermined radius of said initial contact line in response to changes of the temperature of the fluid, whereby the stiffness of said spring member and the pressure at which said valve body is pressed against said valve seat is changed in response to temperature changes of the fluid.

14. In a thermostatically controlled valve for a steam trap having a valve seat and a valve body to be moved against the pressure of the fluid flowing to the valve seat in sealing engagement with the latter, in combination, a stationary abutment member upstream of said valve seat; a movable abutment member upstream of said valve seat, spaced from said stationary abutment member and connected to said valve body; and a column of superposed elements located between said abutment members in the path of fluid flowing to said valve seat and engaging with opposite ends thereof said abutment members, respectively, said superposed elements of said column including a plurality of pairs of bimetal members curving in opposite directions during increase of the temperature of the fluid flowing to said valve seat, a substantially coinically shaped spring member, and a rigid member having a cavity defined by a surface of revolution having a convexly curved generatrix, said rigid member being sandwiched between said spring member and the bimetal member adjacent thereto with the outer surface of said spring member engaging said surface of revolution along an initial substantially circular contact line of a predetermined radius, said column expanding during rise of the temperature of the fluid flowing to said valve seat to move at a predetermined temperature said valve body in engagement with said valve seat and to flex during further rise of the temperature said spring member to an increasing extent so as to change said predetermined radius of said initial contact line in response to changes of the temperature of the fluid, whereby the stiffness of said spring member and the pressure at which said valve body is pressed against said valve seat is changed in response to temperature changes of the fluid.

15. In a thermostatically controlled valve for a steam trap having a valve seat and a valve body to be moved against the pressure of the fluid flowing to the valve seat in sealing engagement with the latter, in combination, a stationary abutment member upstream of said valve seat; a movable abutment member upstream of said valve seat, spaced from said stationary abutment member and connected to said valve body; and a column of superposed elements located between said abutment members in the path of fluid flowing to said valve seat and engaging with opposite ends thereof said abutment members, respectively, said superposed elements of said column including a plurality of pairs of bimetal members curving in oposite directions during increase of the temperature of the fluid flowing to said valve seat, a substantially conically shaped spring member at one end of said column and engaging with its flared end said stationary abutment member, and a rigid member having a cavity defined by a surface of revolution having a convexly curved generatrix, said rigid member being sandwiched between said spring member and the bimetal member adjacent thereto with the outer surface of said spring member engaging said surface of revolution along an initial substantially circular contact line of a predetermined radius, said column expanding during rise of the temperature of the fluid flowing to said valve seat to move at a predetermined temperature said valve body in engagement with said valve seat and to flex during further rise of the temperature said spring member to an increasing extent so as to change said predetermined radius of said initial contact line in response to changes of the temperature of the fluid, whereby the stiffness of said spring member and the pressure at which said valve body is pressed against said valve seat is changed in response to temperature changes of the fluid.

16. In a thermostatically controlled valve for a steam trap having a valve seat and a valve body to be moved against the pressure of the fluid flowing to the valve seat in sealing engagement with the latter, in combination, a stationary abutment member upstream of said valve seat and having a plane abutment surface; a movable abutment member upstream of said valve seat, spaced from said stationary abutment member and connected to said valve body; and a column of superposed elements located between said abutment members in the path of fluid flowing to said valve seat and engaging with opposite ends thereof said abutment members, respectively, said superposed elements of said column including a plurality of pairs of bimetal members curving in opposite directions during increase of the temperature of the fluid flowing to said valve seat, and a substantially conically shaped spring member at one end of said column and engaging with its flared end said plane abutment surface along an initial substantially circular contact line of a predetermined radius, said column expanding during rise of the temperature of the fluid flowing to said valve seat to move at a predetermined temperature said valve body in engagement with said valve seat and to flex during further rise of the temperature said spring member to an increasing extent so as to change said predetermined radius of said initial contact line in response to changes of the temperature of the fluid, whereby the stiffness of said spring member and the pressure at which said valve body is pressed against said valve seat is changed in response to temperature changes of the fluid.

17. In a thermostatically controlled valve for a steam trap having a valve seat and a valve body to be moved against the pressure of the fluid flowing to the valve seat in sealing engagement with the latter, in combination, a stationary abutment member upstream of said valve seat; a movable abutment member upstream of said valve seat, spaced from said stationary abutment member and connected to said valve body; and a column of superposed elements located between said abutment members in the path of fluid flowing to said valve seat and engaging with opposite ends thereof said abutment members, respectively, said superposed elements of said column including a plurality of pairs of bimetal members curving in opposite directions during increase of the temperature of the fluid flowing to said valve seat, a single bimetal member, and a spring member, which in unstressed condition is substantially flat, sandwiched between said single bimetal member and the pair of bimetal members adjacent to said single bimetal member, the bimetal members in each pair of bimetal members curving during rise of their temperature in opposite directions so that the surfaces thereof facing away from each other will be convexly curved and said single bimetal member curving during rise of its temperature with its outer portion thereof toward said spring member so that the spring member will engage the inner concavely curved surface of the single bimetal member and the convexly curved outer surface of one bimetal member of the pair of bimetal members adjacent thereto along two substantially circular contact lines, respectively, said column expanding during rise of the temperature of the fluid flowing to said valve seat to move at a predetermined temperature said valve body in engagement with said valve seat and to flex during further rise of the temperature said spring member to an increasing extent so as to change the radii of said contact lines in response to changes of the temperature of the fluid, whereby the stiffness of said spring member and the pressure at which said valve body is pressed against said valve seat is changed in response to temperature changes of the fluid.

References Cited by the Examiner

UNITED STATES PATENTS 2,912,166  11/1959  Domnick _____ 236—59
3,175,766  3/1965  Pape et al. _____ 236—59

FOREIGN PATENTS 912,572  12/1962  Great Britain.

ALDEN D. STEWART, *Primary Examiner.*